(12) United States Patent
Kikkawa et al.

(10) Patent No.: US 6,879,359 B1
(45) Date of Patent: Apr. 12, 2005

(54) REFLECTION TYPE LIQUID CRYSTAL DISPLAY PROVIDED WITH REFLECTIVE LAYER, COPLANAR GATE ELECTRODE, COLOR FILTER LAYER AND TRANSPARENT PIXEL ELECTRODE AND MANUFACTURE METHOD THEREOF

(75) Inventors: Hironori Kikkawa, Tokyo (JP); Michiaki Sakamoto, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 09/442,353

(22) Filed: Nov. 17, 1999

(30) Foreign Application Priority Data

Nov. 18, 1998 (JP) .......................... 10-327712

(51) Int. Cl.[7] .................... G02F 1/1335; G02F 1/333
(52) U.S. Cl. .................. 349/113; 349/106; 349/110; 257/57
(58) Field of Search ............... 349/113, 110, 349/106; 257/57

(56) References Cited

U.S. PATENT DOCUMENTS

| | | | | |
|---|---|---|---|---|
| 4,106,859 A | * | 8/1978 | Doriguzzi et al. | 349/113 |
| 5,610,741 A | * | 3/1997 | Kimura | 349/113 |
| 5,811,835 A | * | 9/1998 | Seiki et al. | 257/57 |
| 5,940,154 A | * | 8/1999 | Ukita et al. | 349/113 |
| 6,097,459 A | * | 8/2000 | Shimada et al. | 349/113 |
| 6,118,505 A | * | 9/2000 | Nagata et al. | 349/106 |
| 6,118,508 A | * | 9/2000 | Park | 349/141 |
| 6,122,027 A | * | 9/2000 | Ogawa et al. | 349/113 |
| 6,172,728 B1 | | 1/2001 | Hiraishi | 349/139 |

FOREIGN PATENT DOCUMENTS

| | | |
|---|---|---|
| JP | 7-72473 | 3/1995 |
| JP | 8-29787 | 2/1996 |
| JP | 8-254696 | 10/1996 |
| JP | 9-146087 | 6/1997 |

* cited by examiner

*Primary Examiner*—Huyen Ngo
(74) *Attorney, Agent, or Firm*—Choate, Hall & Stewart LLP (57) ABSTRACT

A reflection type liquid crystal display provided with a reflective layer, a coplanar gate electrode, a color filter layer and a transparent pixel electrode and a manufacture method thereof. The reflection type liquid crystal display can be manufactured on the same manufacture line as that of a transmission type liquid crystal display. In order to realize this manufacture method, a photolithography mask capable of forming both a gate electrode and a reflective layer, and a photolithography mask capable of forming only the gate electrode are prepared, and by using either one of the masks, the reflection type liquid crystal display in which both the gate electrode and the reflective layer are formed on a transparent insulation substrate, and the transmission type liquid crystal display in which only the gate electrode is formed, are selectively manufactured.

22 Claims, 5 Drawing Sheets

REFLECTION TYPE LIQUID CRYSTAL DISPLAY PROVIDED WITH REFLECTIVE LAYER, COPLANAR GATE ELECTRODE, COLOR FILTER LAYER AND TRANSPARENT PIXEL ELECTRODE AND MANUFACTURE METHOD THEREOF

BACKGROUND OF THE INVENTION

1. Field of the Invention

The present invention relates to a liquid crystal display and a manufacture method thereof, particularly to a reflection type liquid crystal display provided with a thin film transistor and a manufacture method thereof.

2. Description of the Prior Art

A so-called active matrix type liquid crystal display provided with switching elements such as thin film transistors is constituted of a thin film transistor substrate (hereinafter referred to as the TFT substrate) in which a plurality of thin film transistors are arranged in a matrix manner, and an opposite substrate provided with a transparent common electrode and disposed opposite to the TFT substrate via a liquid crystal layer. In a color liquid crystal display, a color filter layer is formed on either the TFT substrate or the opposite substrate.

Moreover, the color liquid crystal display is largely classified into a reflection type liquid crystal display using a pixel electrode on the side of the TFT substrate formed of an opaque reflective metal, and a transmission type liquid crystal display using a transparent pixel electrode.

When the color filter layer is formed on the side of the TFT substrate, as compared with when the color filter layer is formed on the side of the opposite substrate, no overlap margin of the TFT and opposite substrates is necessary, the aperture ratio can be increased, and brighter display can be performed, which is a preferable mode. Examples of the formation of the color filter layer on the side of the TFT substrate include the transmission type liquid crystal display as disclosed in Japanese Patent Application Laid-Open No. 72473/1995 and the reflection type liquid crystal display as disclosed in Japanese Patent Application Laid-Open No. 254696/1996.

In the former transmission type liquid crystal display, in which the pixel electrode is transparent, even if the color filter layer is disposed on the side of the TFT substrate, the transparent pixel electrode can be disposed on the side of the liquid crystal. Therefore, only little influence is exerted to the electric field applied to the liquid crystal. In the latter reflection type liquid crystal display, however, since the reflective pixel electrode has to be formed below the color filter layer, the interval between the common electrode on the side of the opposite substrate and the pixel electrode is broadened by the thickness of the color filter layer, and the electric field applied to the liquid crystal is weakened, which causes a problem that the liquid crystal drive efficiency is lowered.

Moreover, the transmission type liquid crystal display and the reflection type liquid crystal display are different not only in the constituting conditions of the pixel electrode, but also in the position in which the pixel electrode is formed. When the liquid crystal displays different in the manufacture processes for reasons such as the difference of the layer structure are manufactured on the same manufacture line, optimum conditions in forming the films or performing etching or the like also change, and the setting of a manufacture device has to be changed. Since the setting change requires much time, the production efficiency is remarkably deteriorated. Moreover, since the manufacture device of the liquid crystal display is very expensive, the addition of the manufacture device to eliminate the setting change-over results in a manufacture cost increase.

Furthermore, as a special example, as disclosed in Japanese Patent Application Laid-Open No. 29787/1996, the liquid crystal display which can be applied to both the transmission type and the reflection type has also been proposed. This proposal comprises employing a color development layer including a fluorescent material to obtain a brighter color filter than the conventional color filter, forming the color development layer on a reflective layer even in the reflection type, and forming the transparent pixel electrode on the color development layer.

However, even in such reflection type liquid crystal display, the reflective layer is newly disposed using a metal different from the wiring metal of the thin film transistor in a separate process, and the manufacturing of the reflection type liquid crystal display and the transmission type liquid crystal display using the same manufacture line is not considered at all.

SUMMARY OF THE INVENTION

An object of the present invention is to provide a reflection type liquid crystal display and a manufacture method therefor, which can be manufactured on the same manufacture line as that of a transmission type liquid crystal display and which can enhance the manufacture efficiency.

The present invention provides a reflection type liquid crystal display and a manufacture method therefor, in which a color filter and a black matrix are formed on a thin film transistor substrate, and a reflective layer is simultaneously formed during forming a metal wiring, so that the reflection type liquid crystal display can be manufactured in the same manufacture processes as those of the transmission type liquid crystal display.

The reflection type liquid crystal display of the present invention is structurally different from the transmission type liquid crystal display in that it is provided with a reflective layer, and the structure other than the reflective layer is the same.

A gate electrode is usually formed by using a photolithography technique and patterning a metal layer. Similarly, the reflective layer can be formed by using the photolithography technique and patterning the metal layer. For this reason, when a photolithography mask having a pattern with no reflective layer formed thereon and a photolithography mask having a pattern with the reflective layer formed thereon are prepared, by selectively using either one of the two types of masks, the liquid crystal display with the reflective layer formed thereon or the liquid crystal display with no reflective layer formed thereon (i.e., the transmission type liquid crystal display) can be manufactured as occasion demands.

As described above, according to the reflection type liquid crystal display of the present invention, simply by preparing two types of masks different in the pattern, the reflection type liquid crystal display can be manufactured in the same manufacture processes as those of the transmission type liquid crystal display.

The reflective layer is preferably formed of aluminum or aluminum alloy.

Since the aluminum or the aluminum alloy has a high reflectance, it is appropriate as the reflective layer.

As the aluminum alloy, an alloy of aluminum and neodymium can be selected.

It is preferable to dispose a diffusion preventive layer below the reflective layer to prevent the aluminum from being diffused to a lower layer.

For example, the aluminum has a property of being diffused in silicon when in direct contact with the silicon. For this reason, it is preferable to dispose the diffusion preventive layer below the reflective layer of aluminum to prevent the aluminum from being diffused.

As the diffusion preventive layer, for example, a layer of titanium can be used.

A rough portion or a rough portion is formed on a first transparent insulation substrate or a gate insulation film, and the reflective layer is preferably formed to cover the rough portion.

For example, when the reflective layer of a metal is used, surrounding materials, observer's face, and the like are reflected into the reflective layer as in a mirror, which degrades the display quality in some cases. On the other hand, when the rough portion is disposed, the reflective layer functions as a scattering preventive layer, which can suppress the mirroring phenomenon.

This rough portion can be formed from various materials.

For example, it is preferable to select a material which is not deformed in the subsequent heating process, and which contains no high density impurities adversely affecting the liquid crystal display. Examples of the material include a photosensitive resist.

Moreover, the rough portion can be formed by various methods.

For example, the rough portion can be formed by forming an insulation film such as a silicon nitride film, and patterning the insulation film.

Alternatively, the rough portion can be formed by cutting the surface of the first transparent insulation substrate or the gate insulation film.

When the rough portion is formed on the first transparent insulation substrate or the gate insulation film, the surface area of the reflective layer formed on the rough portion is enlarged as compared with when the reflective layer is formed on a flat face. Therefore, the reflection efficiency can be enhanced.

DESCRIPTION OF THE PREFERRED EMBODIMENTS

Figure 1:
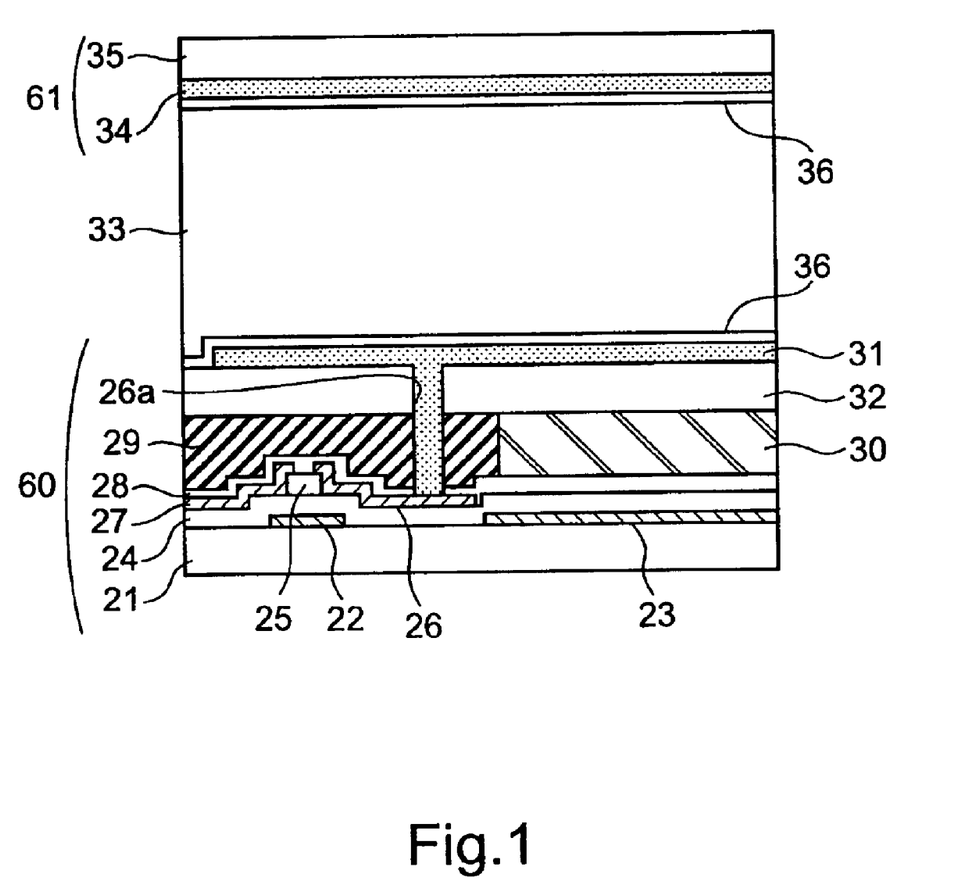
FIG. 1 is a sectional view showing the constitution of a liquid crystal display according to a first embodiment of the present invention.

Referring to FIG. 1, a liquid crystal layer 33 is held between a thin film transistor substrate (TFT substrate) 60 on which a thin film transistor is formed, and an opposite substrate 61 disposed opposite to the substrate 60.

For the TFT substrate 60, a gate electrode 22 and a reflective layer 23 are simultaneously formed of the same material on a first transparent insulation substrate 21 such as a glass plate. For example, aluminum or aluminum alloy such as aluminum-neodymium alloy is employed. Although the gate electrode 22 and the reflective layer 23 are formed on the same flat face, they are electrically separated. A gate insulation film 24 is formed on the substrate 21 to cover the gate electrode 22 and the reflective layer 23. Arranged above the gate electrode 22 are a semiconductor layer 25 formed on the gate insulation film 24, and a source electrode 26 and a drain electrode 27 formed in contact with the semiconductor layer 25 on the gate insulation film 24. A passivation film 28 is formed to cover the semiconductor layer 25, the source electrode 26, the drain electrode 27 and the gate insulation film 24 in common. A black matrix 29 and a color filter 30 are disposed adjacent to each other on the passivation film 28. An overcoat layer 32 is formed to cover the black matrix 29 and the color filter 30 in common, and a transparent pixel electrode 31 connected to the source electrode 26 via a contact hole 26a is formed on the overcoat layer 32. A liquid crystal alignment layer 36 is formed on the pixel electrode 31 to cover the pixel electrode 31. Moreover, the reflective layer 23 has a sufficient size to cover the entire color filter 30.

In the opposite substrate 61, a transparent opposite electrode 34 is formed on a second transparent insulation substrate 35 such as a glass plate. The liquid crystal alignment layer 36 is formed on the opposite electrode 34 to cover the opposite electrode 34.

The TFT substrate 60 and the opposite substrate 61 are disposed so that the liquid crystal alignment layers 36 face each other, and the liquid crystal layer 33 is held between the opposite liquid crystal alignment layers 36.

A method of manufacturing the liquid crystal display according to the embodiment will be described hereinafter.

Aluminum is formed into a film on the first transparent insulation substrate 21 by sputtering, and the photolithography technique is used to perform patterning, so that the gate electrode 22 and the reflective layer 23 are simultaneously formed.

The aluminum has a very high reflectance, and is an appropriate material as the reflective layer.

In this case, since pure aluminum easily generates hillocks, and deteriorates yield in producing the liquid crystal display, the aluminum-neodymium alloy with several percents of neodymium mixed therein is preferably used.

Thereafter, a silicon nitride film to form the gate insulation film 24 is formed on the entire surface by a chemical vapor developing method (hereinafter referred to as CVD).

Furthermore, a non-doped amorphous silicon (hereinafter referred to as "a-Si"), and an n+ type doped amorphous silicon (hereinafter referred to as "n+ type a-Si") are continuously formed into films on the gate insulation film 24 by CVD, and these films are subjected to a patterning to form the semiconductor layer 25. The n+ type a-Si ensures the ohmic contact of the drain electrode 27 and the source electrode 26 with the a-Si.

Chromium is formed into a film on the semiconductor layer 25 by sputtering, and the chromium film is subjected to patterning to form the drain electrode 27 and the source electrode 26.

Thereafter, a gas system for etching the n+ type a-Si is used to perform dry etching to remove the n+ type a-Si between the drain electrode 27 and the source electrode 26. This prevents a current from directly flowing between the source electrode 26 and the drain electrode 27 via the n+ type a-Si.

Subsequently, the silicon nitride is formed into a film by CVD, and the silicon nitride film is subjected to patterning to form the passivation film 28. The passivation film 28 prevents impurities such as ions from entering the semiconductor layer 25 and prevents the thin film transistor from causing its operation failure.

As described above, the thin film transistor (TFT) is formed on the first transparent insulation substrate 21.

A black resist with a black pigment dispersed in an acrylic photosensitive polymer is subjected to patterning on the upper face of the thin film transistor area fabricated as described above by the photolithography process, to form the black matrix 29.

The black resist having a high insulation property is used. When the insulation property of the black resist is low, the black matrix 29 on the thin film transistor has a certain electric potential, the back channel of the thin film transistor is activated, and excellent display cannot be realized.

Subsequently, acrylic photosensitive polymer materials with red (R), green (G) and blue (B) pigments dispersed therein are subjected to patterning by three photolithography processes, to form the color filter 30 adjacent to the black matrix 29.

Thereafter, a photosensitive acrylic polymer having a high transparency is subjected to patterning by the photolithography process, to form the overcoat layer 32 on the black matrix 29 and the color filter 30. The overcoat layer 32 prevents the impurities such as ions eluted from the color filter 30 from being mixed into the liquid crystal layer 33, can uniformly control the thickness of the liquid crystal layer 33 to flat the surface of the TFT substrate 60, suppresses the occurrence of discretion, and contributes to the realization of excellent display.

For the color filter 30 and the overcoat layer 32, the material which does not change in properties in temperatures of 200 degrees or more is selected so as to sufficiently withstand the subsequent heating process.

Moreover, in the embodiment, the acrylic polymer is used as the material of the overcoat layer 32, but any insulation film, such as polysilazane, can be used as long as it is transparent and can be formed by spin coating.

Alternatively, the insulation film formed by sputtering or CVD may be polished to form a flatted film. According to this method, since a very flat film face can be formed, a high-precision patterning can be performed, and a liquid crystal display superior in heat resistance can be obtained.

The pixel electrode 31 is formed by forming ITO (Indium-Tin-Oxide) into a film on the overcoat layer 32 by sputtering, and subjecting the film to patterning.

On the second transparent insulation substrate 35 forming the opposite substrate 61, ITO is formed into a film by sputtering, to form the opposite electrode 34.

The liquid crystal alignment layers 36 of polyimide are formed on the TFT substrate 60 and the opposite substrate 61 formed as described above, respectively.

After both substrates 60, 61 are rubbing-treated, so that a nematic liquid crystal containing a chiral agent with a black two-tone pigment added thereto (hereinafter referred to as GH nematic liquid crystal) is twisted and oriented at an angle of 270 degrees, polymer beads having diameters fit for a gap are scattered over the entire surface as a spacer. Two substrates 60, 61 are overlapped and bonded so that the liquid crystal alignment layers 36 face each other, and the GH nematic liquid crystal is injected between the two substrates 60 and 61.

In the embodiment, the GH nematic liquid crystal is used as the liquid crystal layer 33, but a polymer dispersed type liquid crystal, a 45 degree twisted/oriented nematic liquid crystal using one polarizing plate, and the like may be used as the reflection type liquid crystal layer.

The reflection type liquid crystal display of the embodiment is fabricated as described above.

The effect of the liquid crystal display according to the embodiment will be described hereinafter.

First, in the liquid crystal display of the embodiment, since the color filter 30 and the black matrix 29 are formed as the elements constituting the thin film transistor substrate 60, it is unnecessary to provide a margin in consideration of the overlap deviation of the thin film transistor substrate 60 and the opposite substrate 61.

As a result, in the liquid crystal display of the embodiment, the aperture ration can be raised, and a brighter display can be performed.

Figure 3:
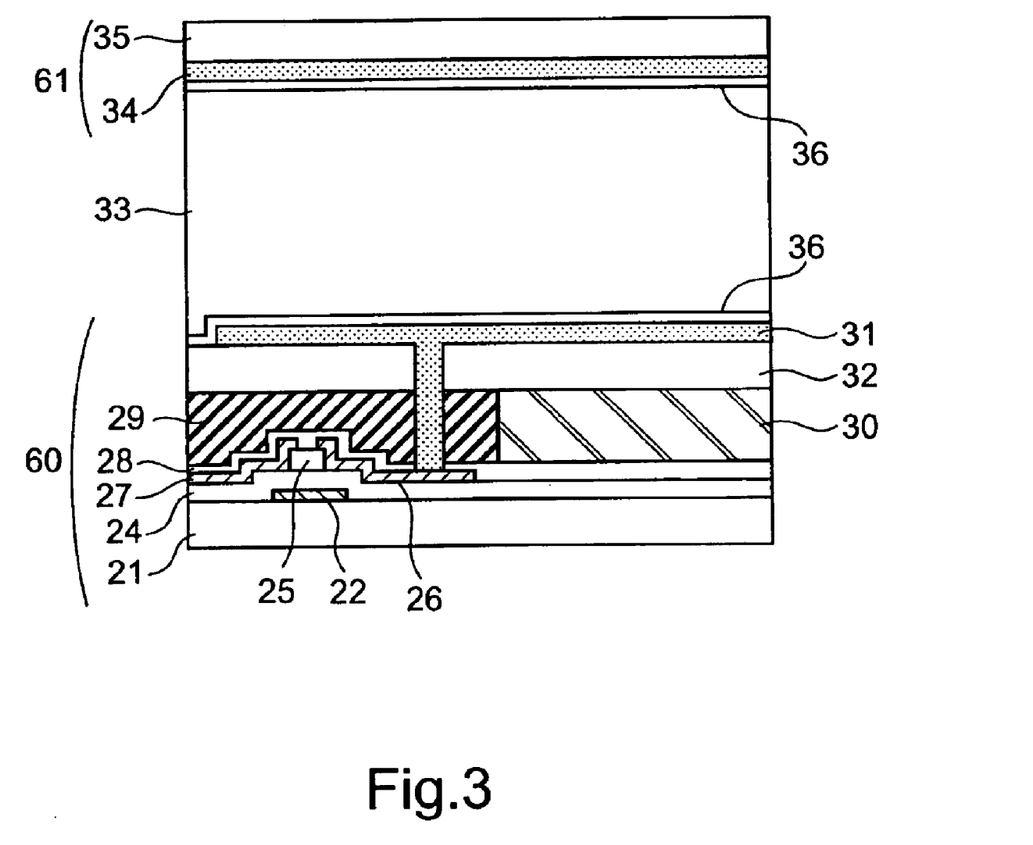
FIG. 3 is a sectional view showing the constitution of a transmission type liquid crystal display which can be fabricated in the same processes as those of the first and second embodiments.

FIG. 3 is a sectional view showing the constitution of a transmission type liquid crystal display. As apparent from the comparison of FIGS. 1 and 3, the liquid crystal display of the embodiment is different from the transmission type liquid crystal display shown in FIG. 3 only in that it is provided with the reflective layer 23. The constitution of the liquid crystal display of the embodiment other than the reflective layer 23 is the same as that of the transmission type liquid crystal display.

The gate electrode 22 is usually formed by using the photolithography technique and patterning the metal layer. Similarly, the reflective layer 23 can be formed by using the photolithography technique and patterning the metal layer. For this reason, when the photolithography mask having a pattern with no reflective layer 23 and the photolithography mask having a pattern with the reflective layer 23 formed thereon are prepared, by selectively using either one of the two types of masks, the liquid crystal display with the reflective layer 23 formed thereon (i.e., the reflection type liquid crystal display) or the liquid crystal display with no reflective layer 23 formed thereon (i.e., the transmission type liquid crystal display) can be manufactured as occasion demands.

As described above, according to the reflection type liquid crystal display of the embodiment, simply by preparing two types of masks different in the pattern, the reflection type liquid crystal display can be manufactured in the same manufacture processes as those of the transmission type liquid crystal display.

When the liquid crystal displays different in the manufacture processes for reasons such as the difference of the layer structure are manufactured on the same manufacture line, the optimum conditions in forming the films or performing the etching or the like also change, and the setting of the manufacture device has to be changed. Since the setting change requires much time, the production efficiency is remarkably deteriorated. Moreover, since the manufacture device of the liquid crystal display is very expensive, the addition of the manufacture device to eliminate the setting change-over results in a manufacture cost increase.

According to the embodiment, since the reflection type liquid crystal display is the same as the transmission type liquid crystal display in the manufacture processes, the reflection type liquid crystal display can also be manufactured using the same manufacture line as that of the transmission type liquid crystal display without changing the setting of the manufacture device.

Alumina or aluminum alloy has a high reflectance, and is an appropriate material as the reflective layer. However, the aluminum is diffused in silicon when directly contacting the silicon, which is a cause of disturbance in transistor operation. Therefore, a diffusion preventive film is usually formed between aluminum and silicon to prevent aluminum from being dispersed in silicon.

In the embodiment shown in FIG. 1, since the gate insulation film 24 serves as the diffusion preventive film, it is unnecessary to form a new diffusion preventive layer. Specifically, a high-reflection, large-luminance liquid crystal display can be obtained without increasing the manufacture processes.

Figure 2:
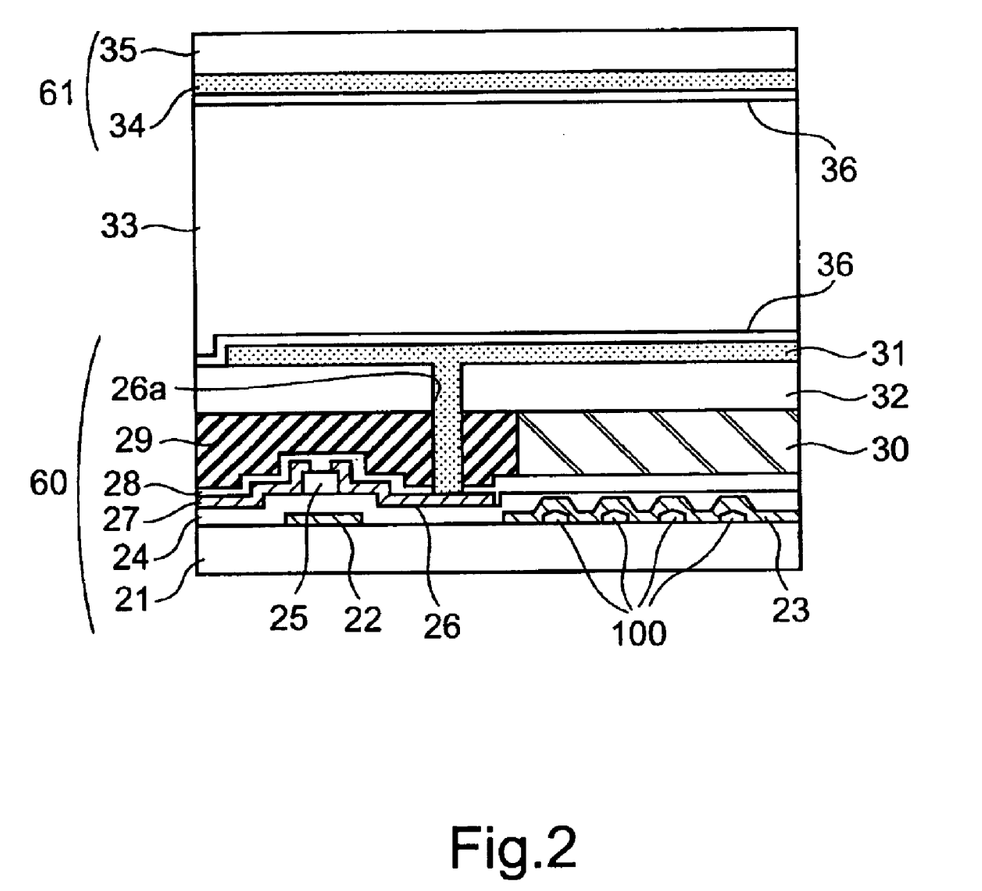
FIG. 2 is a sectional view showing the constitution of the liquid crystal display according to a second embodiment of the present invention.

FIG. 2 is a sectional view showing the constitution of the liquid crystal display according to a second embodiment of the present invention.

The liquid crystal display of the second embodiment is different from the liquid crystal display of the first embodiment in that concave/convex portions or rough portions 100 are formed on the first transparent insulation substrate 21. Except the formation of the rough portions 100, the liquid crystal display of the second embodiment has the same constitution as that of the liquid crystal display of the first embodiment.

As shown in FIG. 2, the rough portions 100 are formed on a first area of the substrate 21 located under the reflective layer 23. A second area of the substrate 21 is maintained as relatively smooth without any rough portions. The switching element that includes the gate electrode 22 is formed on the second area of the substrate 21.

The manufacture processes of the rough portions 100 or uneven portions will be described hereinafter. The manufacture processes other than the process of forming the rough portions 100 are the same as those in the liquid crystal display according to the first embodiment.

First, a silicon nitride film is formed on the transparent insulation substrate 21 by CVD, and is subjected to patterning, to form the rough portions 100.

The silicon nitride film formed by CVD is used as the material of the rough portions 100, but any material can be used as long as it is not deformed in the subsequent heating process or contains no high-density impurities adversely affecting the liquid crystal display. For example, when the photosensitive resist, and the like are used, high and large rough portions 100 can easily be fabricated.

Moreover, the rough portions 100 can be formed by cutting the surface of the transparent insulation substrate 21.

The subsequent processes are the same as those in the first embodiment.

According to the liquid crystal display of the second embodiment, in addition to the effects obtained by the liquid crystal display of the first embodiment, the following effects can be obtained.

For example, when the reflective layer of a metal or the like is used in the reflection type liquid crystal display, surrounding materials, observer's face, and the like are reflected as in a mirror, which degrades the display quality in some cases. On the other hand, in the second embodiment, since the rough portions 100 are disposed, the reflective layer 23 functions as a scattering preventive layer, so that the mirroring phenomenon is suppressed.

Therefore, according to the second embodiment, there is provided a high-luminance reflection type liquid crystal display without any mirroring phenomenon.

The reflection type liquid crystal display provided with the reflective layer having the rough portions is also disclosed in Japanese Patent Application Laid-Open No. 146087/1997, but it is not constituted to be manufactured together with the transmission type liquid crystal display on the same manufacture line in the same manner as the above-described reflection type liquid crystal display.

FIG. 3 is a sectional view showing the constitution of the transmission type liquid crystal display. As apparent from the comparison of FIGS. 2 and 3, the liquid crystal display of the second embodiment is different from the transmission type liquid crystal display shown in FIG. 3 in that it is provided with the rough portions 100 and the reflective layer 23. The constitution of the liquid crystal display of the second embodiment other than the rough portions 100 and the reflective layer 23 is the same as that of the transmission type liquid crystal display.

Therefore, in the same manner as the first embodiment, when the photolithography mask having the pattern with no reflective layer 23 and the photolithography mask having the pattern with the reflective layer 23 formed thereon are prepared, by selectively using either one of the two types of masks, the liquid crystal display with the reflective layer 23 formed thereon (i.e., the reflection type liquid crystal display) or the liquid crystal display without the reflective layer 23 (i.e., the transmission type liquid crystal display) can be manufactured as occasion demands.

Particularly, when the liquid crystal display provided with both the rough portions 100 and the reflective layer 23 is manufactured, the process for forming the rough portions 100 is merely added before the process for forming the reflective layer 23, and the subsequent manufacture processes are the same as those of the transmission type liquid crystal display.

As described above, according to the reflection type liquid crystal display of the second embodiment, only by adding the process of forming the rough portions, the reflection type liquid crystal display can be manufactured under the same manufacture processes as those of the transmission type liquid crystal display.

According to the second embodiment, since the reflection type liquid crystal display is the same as the transmission type liquid crystal display in the manufacture processes, the reflection type liquid crystal display which can prevent the mirroring phenomenon can also be manufactured using the same manufacture line as that of the transmission type liquid crystal display without changing the setting of the manufacture device.

Figure 4:
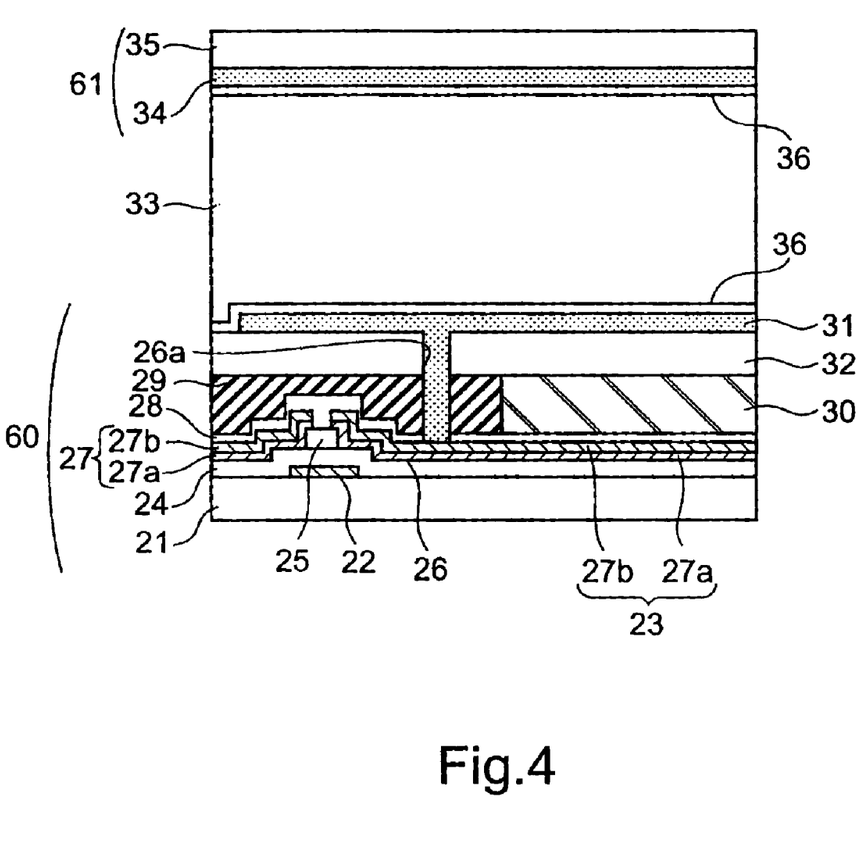
FIG. 4 is a sectional view showing the constitution of the liquid crystal display according to a third embodiment of the present invention.

FIG. 4 is a sectional view showing the constitution of the liquid crystal display according to a third embodiment of the present invention.

In the reflection type liquid crystal display, the liquid crystal layer 33 is held between the thin film transistor substrate (TFT substrate) 60 on which the thin film transistor is formed and the opposite substrate 61.

For the TFT substrate 60, first, the gate electrode 22 is formed of aluminum or aluminum alloy such as aluminum-neodymium alloy on the first transparent insulation substrate 21 such as a glass plate, and the gate insulation film 24 is formed on the first transparent insulation substrate 21 to cover the gate electrode 22. Arranged above the gate electrode 22 are the semiconductor layer 25 formed on the gate insulation film 24, and the source electrode 26 and the drain electrode 27 formed in contact with the semiconductor layer 25 on the gate insulation film 24. The reflective layer 23 is formed integrally with the source electrode, and extends onto the gate insulation film 24. The passivation film 28 is formed to cover the semiconductor layer 25, the source electrode 26, the drain electrode 27 and the reflective layer 23 in common. The black matrix 29 and the color filter 30 are disposed adjacent to each other on the passivation film 28. The overcoat layer 32 is formed to cover the black matrix 29 and the color filter 30 in common. The pixel electrode 31 connected to the source electrode 26 via the contact hole 26a is formed on the overcoat layer 32.

As described later, the reflective layer 23 is simultaneously formed of the same material as that of the source electrode 26. The reflective layer 23 has a sufficient size to cover the entire area of the color filter 30. Moreover, the liquid crystal alignment layer 36 is formed on the pixel electrode 31 to cover the pixel electrode 31.

For the opposite substrate 61, the liquid crystal alignment layer 36 is formed to cover the opposite electrode 34 formed on the second transparent insulation substrate 35 such as a glass plate.

The TFT substrate 60 and the opposite substrate 61 are disposed so that the liquid crystal alignment layers 36 face each other, and the liquid crystal layer 33 is held between the opposite liquid crystal alignment layers 36.

A method of manufacturing the liquid crystal display according to the third embodiment will be described hereinafter.

On the first transparent insulation substrate 21 aluminum is formed into a film by sputtering, and the photolithography technique is used to perform patterning, so that the gate electrode 22 is formed.

Thereafter, silicon nitride to form the gate insulation film 24 is formed into a film on the entire surface by CVD. On the gate insulation film 24, the non-doped a-Si film and the n+ type a-Si film are continuously formed by CVD, and these films are subjected to patterning to form the semiconductor layer 25.

The n+ type a-Si film ensures the ohmic contact of the drain electrode 27 and the source electrode 26 with the a-Si film.

Subsequently, a titanium film 27a and an aluminum film 27b are formed on the semiconductor layer 25 and the gate insulation film 24 by sputtering, and these films 27a, 27b are subjected to patterning to form the drain electrode 27, the source electrode 26 and the reflective layer 23.

The titanium film is disposed under the aluminum film in order to prevent aluminum from being diffused in the a-Si film and from disturbing the transistor operation.

Thereafter, in the gas system in which the n+ type a-Si film can be etched, dry etching is performed to remove the n+ type a-Si film between the drain electrode 27 and the source electrode 26. This prevents a current from directly flowing between the source electrode 26 and the drain electrode 27 via the n+ type a-Si film.

Subsequently, silicon nitride is formed into a film by CVD, and the passivation film 28 is formed by patterning. The passivation film 28 prevents the impurities such as ions from entering the semiconductor layer 25 and prevents the thin film transistor from causing its operation failure.

The thin film transistor is formed on the first transparent insulation substrate 21 as described above.

Subsequently, a black resist with a black pigment dispersed in an acrylic photosensitive polymer is subjected to patterning on the passivation film 28 by the photolithography process, to form the black matrix 29.

The black resist having a high insulation property is used. When the insulation property of the black resist is low, the black matrix 29 on the thin film transistor has a certain electric potential, the back channel of the transistor is activated, and excellent display cannot be realized.

Subsequently, acrylic photosensitive polymer materials with the pigments of three primary colors, red (R), green (G) and blue (B) dispersed therein are subjected to patterning by three photolithography processes, to form the color filter 30 adjacent to the black matrix 29 on the passivation film 28. Subsequently, a photosensitive acrylic polymer having a high transparency is subjected to patterning by the photolithography process, to form the overcoat layer 32 on the black matrix 29 and the color filter 30.

The overcoat layer 32 prevents the impurities such as ions eluted from the color filter 30 from being mixed into the liquid crystal layer 33, can uniformly control the thickness of the liquid crystal layer 33 to flat the surface of the TFT substrate 60, suppresses the occurrence of discretion, and contributes to the realization of excellent liquid crystal display.

For the color filter 30 and the overcoat layer 32, the material which does not change in properties in temperatures of 200 degrees or more is selected so as to sufficiently withstand the subsequent heating process.

In the third embodiment, the acrylic polymer is used as the material of the overcoat layer 32, but any insulation film can be used as long as it is transparent and can be formed by spin coating. For example, polysilazane, and the like can be used.

Alternatively, the insulation film formed by sputtering or CVD may be polished to form a flatted film. According to this method, since a very flat film face can be formed, a high-precision patterning can be performed, and a superior heat resistance can be obtained.

Subsequently, ITO (Indium-Tin-Oxide) is formed into a film on the overcoat layer 32 by sputtering, and the film is subjected to patterning to form the pixel electrode 31.

The TFT substrate 60 is formed as described above.

On the second transparent insulation substrate 35, ITO is formed into a film by sputtering, to form the opposite electrode 34, so that the opposite substrate 61 is obtained.

The liquid crystal alignment layers 36 of polyimide are formed on the TFT substrate 60 and the opposite substrate 61 formed as described above, respectively. After both substrates 60, 61 are rubbing-treated, so that a nematic liquid crystal containing a chiral agent with a black two-tone pigment added thereto (GH nematic liquid crystal) is twisted and oriented at an angle of 270 degrees, polymer beads having diameters fit for a gap are scattered over the entire surface as a spacer. Subsequently, both substrates 60, 61 are overlapped and bonded so that the liquid crystal alignment layers 36 face each other, and the GH nematic liquid crystal is injected between the substrates 60 and 61.

In the third embodiment, the GH nematic liquid crystal is used as the liquid crystal layer 33, but a polymer dispersed type liquid crystal, a 45 degree twisted/oriented nematic liquid crystal using one polarizing plate, and the like may be used as the reflection type liquid crystal layer.

The reflection type liquid crystal display of the third embodiment is fabricated as described above.

The effect of the liquid crystal display according to the third embodiment will be described hereinafter.

First, in the liquid crystal display of the third embodiment, since the color filter 30 and the black matrix 29 are formed as the elements constituting the thin film transistor substrate 60, it is unnecessary to provide a margin in consideration of the overlap deviation of the thin film transistor substrate 60 and the opposite substrate 61.

As a result, in the liquid crystal display of the third embodiment, the aperture ratio can be raised, and a high luminance display can be performed.

Figure 5:
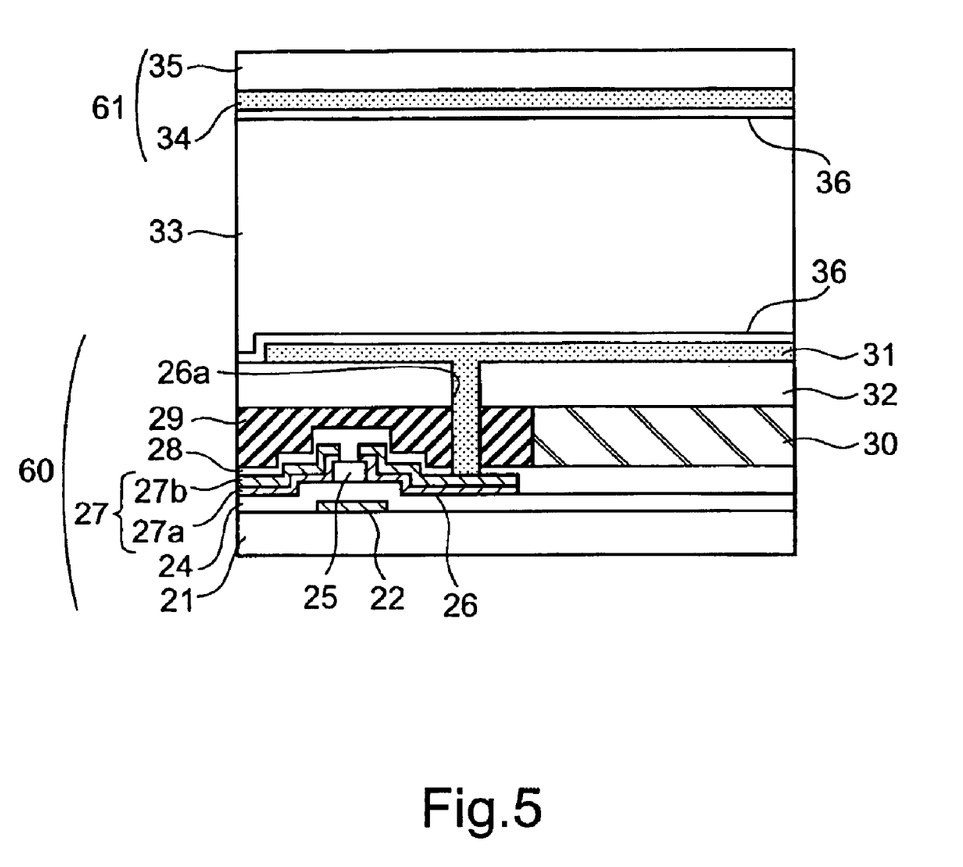
FIG. 5 is a sectional view showing the constitution of the transmission type liquid crystal display which can be fabricated in the same processes as those of the third embodiment.

FIG. 5 is a sectional view showing the constitution of the transmission type liquid crystal display. As apparent from the comparison of FIGS. 4 and 5, the liquid crystal display of the third embodiment is different from the transmission type liquid crystal display shown in FIG. 5 only in that it is provided with the reflective layer 23. The constitution of the liquid crystal display of the third embodiment other than the reflective layer 23 is the same as that of the transmission type liquid crystal display.

The drain electrode 27 and the source electrode 26 are usually formed by using the photolithography technique and patterning the metal layer. Similarly, the reflective layer 23 can also be formed by using the photolithography technique and patterning the metal layer. For this reason, when the photolithography mask having the pattern with no reflective layer 23 and the photolithography mask having the pattern with the reflective layer 23 formed thereon are prepared, by selectively using either one of the two types of masks, the liquid crystal display with the reflective layer 23 formed thereon (i.e., the reflection type liquid crystal display) or the liquid crystal display without the reflective layer 23 (i.e., the transmission type liquid crystal display) can be manufactured as occasion demands.

As described above, according to the reflection type liquid crystal display of the third embodiment, only by preparing two types of masks different in the pattern, the reflection type liquid crystal display can be manufactured in the same manufacture processes as those of the transmission type liquid crystal display.

According to the third embodiment, since the reflection type liquid crystal display is the same as the transmission type liquid crystal display in the manufacture processes, the reflection type liquid crystal display can be manufactured using the same manufacture line as that of the transmission type liquid crystal display without changing the setting of the manufacture device.

As described above, according to the present invention, in the reflection type liquid crystal display in which the color filter and the black matrix are formed on the thin film transistor substrate, the reflective layer is simultaneously formed with the same material as that of the metal wiring during laying the metal wiring. For this reason, since the high-reflectance aluminum reflective layer can be prepared by the same manufacture method as that of the transmission type liquid crystal display without changing the manufacture processes, the high-performance reflection type liquid crystal display can be produced at low costs.

What is claimed is:

1. A reflection type liquid crystal display, comprising:
a pair of substrates disposed opposite to each other with a liquid crystal layer disposed therebetween;
a first substrate area formed using rough portions on a portion of one surface of at least one of said pair of substrates, wherein said one of at least one of said pair of substrates also has a second substrate area that is relatively smooth;
a plurality of switching elements formed on said second substrate area;
a reflective layer constituted of a same material as a material constituting a gate electrode of said plurality of switching elements and simultaneously formed on said first substrate area during formation of said gate electrode of said plurality of switching elements on a same plane as a plane of said gate electrode;
a transparent pixel electrode formed on said reflective layer via an insulation layer and connected to an electrode included in said plurality of switching elements; and
a color filter layer disposed between said reflective layer and said transparent pixel electrode.

2. The reflection type liquid crystal display according to claim 1, wherein said plurality of switching elements includes at least a thin film transistor.

3. The reflection type liquid crystal display according to claim 2, wherein said thin film transistor comprises the gate electrode, wherein the gate electrode is electrically connected to a scanning line, a gate insulation film formed to cover said gate electrode, a semiconductor layer formed on said gate insulation film, a drain electrode electrically connected to a signal line, and a source electrode electrically connected to said transparent pixel electrode, and wherein said reflective layer is electrically separated from said gate electrode.

4. The reflection type liquid crystal display according to claim 1, wherein a shielding layer is disposed on an area of one of said plurality of switching elements.

5. The reflection type liquid crystal display according to claim 1, wherein said reflective layer is formed of aluminum or an aluminum alloy.

6. The reflection type liquid crystal display according to claim 5, wherein said aluminum alloy is an alloy of aluminum and neodymium.

7. The reflection type liquid crystal display according to claim 5, wherein a diffusion preventive layer is disposed below said reflective layer to prevent said aluminum from being diffused to a lower layer.

8. The reflection type liquid crystal display according to claim 7, wherein said diffusion preventive layer is formed of titanium.

9. The reflection type liquid crystal display according to claim 1, wherein said rough portions are formed of a material which is not deformed in a heating process performed later and which does not contain high density impurities adversely affecting the liquid crystal display.

10. The reflection type liquid crystal display according to claim 1, wherein said rough portions are formed by forming an insulation film and patterning the insulation film.

11. A reflection type liquid crystal display, comprising:
a pair of substrates disposed opposite to each other via a liquid crystal layer;
a first substrate area formed using rough portions on a portion of one surface of at least one of said pair of substrates, wherein said one of at least one of said pair of substrates also has a second substrate area that is relatively smooth;
a plurality of switching elements formed on said second substrate area;
a reflective layer simultaneously formed on said first substrate area during formation of gates of said switching elements;
a transparent pixel electrode formed on said reflective layer via an insulation layer and connected to one electrode constituting one of said switching elements; and
a color filter layer disposed between said reflective layer and said transparent pixel electrode;
wherein each of said plurality of switching elements is a thin film transistor, and said reflective layer is formed of the same material as a material of a gate electrode of said thin film transistor and constituted on the same plane as a plane of said gate electrode.

12. A reflection type liquid crystal display, comprising:

a pair of substrates disposed opposite to each other via a liquid crystal layer;

a first substrate area formed using rough portions on a portion of one surface of at least one of said pair of substrates, wherein said one of at least one of said pair of substrates also has a second substrate area that is relatively smooth;

a plurality of switching elements formed on said second substrate area;

a reflective layer simultaneously formed on said first substrate area during formation of gates of said switching elements;

a transparent pixel electrode formed on said reflective layer via an insulation layer and connected to one electrode constituting one of said switching elements; and a color filter layer disposed between said reflective layer and said transparent pixel electrode;

wherein said thin film transistor comprises a gate electrode electrically connected to a scanning line, a gate insulation film formed to cover said gate electrode, a semiconductor layer formed on said gate insulation film, a drain electrode electrically connected to a signal line, and a source electrode electrically connected to said transparent pixel electrode, and wherein said reflective layer is electrically separated from said gate electrode and is formed of a same material as a material of said gate electrode and formed on a same plane as a plane of said gate electrode.

13. A reflection type liquid crystal display, comprising:

a pair of substrates disposed opposite to each other with a liquid crystal layer disposed therebetween;

a first substrate area formed using rough portions on a portion of one surface of at least one of said pair of substrates, wherein said one of at least one of said pair of substrates also has a second substrate area that is relatively smooth;

a plurality of switching elements formed on said second substrate area;

a reflective layer constituted of a same material as a material constituting a gate electrode of one of said plurality of switching elements and formed on said first substrate area on a same plane as a plane of said gate electrode;

a transparent pixel electrode formed on said reflective layer via an insulation layer and connected to an electrode included in said plurality of switching elements;

a color filter layer disposed between said reflective layer and said transparent pixel electrode; and wherein said rough portions are formed of a material which is not deformed in a heating process performed later and which does not contain high density impurities adversely affecting the liquid crystal display.

14. A reflection type liquid crystal display, comprising:

a pair of substrates disposed opposite to each other with a liquid crystal layer disposed therebetween;

a first substrate area formed using rough portions on a portion of one surface of at least one of said pair of substrates, wherein said one of at least one of said pair of substrates also has a second substrate area that is relatively smooth;

a plurality of switching elements formed on said second substrate area;

a reflective layer constituted of a same material as a material constituting a gate electrode of one of said plurality of switching elements and formed on said first substrate area on a same plane as a plane of said gate electrode;

a transparent pixel electrode formed on said reflective layer via an insulation layer and connected to an electrode included in said plurality of switching elements;

a color filter layer disposed between said reflective layer and said transparent pixel electrode; and wherein said rough portions are formed by forming an insulation film and patterning the insulation film.

15. A reflection type liquid crystal display, comprising:

a pair of substrates disposed opposite to each other with a liquid crystal layer disposed therebetween;

a first substrate area formed using rough portions on a portion of one surface of at least one of said pair of substrates, wherein said one of at least one of said pair of substrates also has a second substrate area that is relatively smooth;

a plurality of switching elements formed on said second substrate area;

a reflective layer formed on said first substrate area on a same plane as a plane of said gate electrode;

a transparent pixel electrode formed on said reflective layer via an insulation layer and connected to an electrode included in said plurality of switching elements; and a color filter layer disposed between said reflective layer and said transparent pixel electrode.

16. The reflection type liquid crystal display according to claim 15, wherein said plurality of switching elements includes at least a thin film transistor.

17. The reflection type liquid crystal display according to claim 16, wherein said thin film transistor comprises the gate electrode, wherein the gate electrode is electrically connected to a scanning line, a gate insulation film formed to cover said gate electrode, a semiconductor layer formed on said gate insulation film, a drain electrode electrically connected to a signal line, and a source electrode electrically connected to said transparent pixel electrode, and wherein said reflective layer is electrically separated from said gate electrode.

18. The reflection type liquid crystal display according to claim 15, wherein a shielding layer is disposed on an area of one of said plurality of switching elements.

19. The reflection type liquid crystal display according to claim 15, wherein said reflective layer is formed of aluminum or an aluminum alloy.

20. The reflection type liquid crystal display according to claim 19, wherein said aluminum alloy is an alloy of aluminum and neodymium.

21. The reflection type liquid crystal display according to claim 15, wherein said rough portions are formed of a material which is not deformed in a heating process performed later and which does not contain high density impurities adversely affecting the liquid crystal display.

22. The reflection type liquid crystal display according to claim 15, wherein said rough portions are formed by forming an insulation film and patterning the insulation film.

* * * * *